United States Patent
Maier, Jr. et al.

(10) Patent No.: US 6,265,971 B1
(45) Date of Patent: Jul. 24, 2001

(54) FIBER-SYNC COMMUNICATIONS CHANNEL

(75) Inventors: Paul H. Maier, Jr., Athol; Anthony J. Capowski, Westford; Timothy E. Dorr, Gardner, all of MA (US)

(73) Assignee: Simplex Time Recorder Company, Westminster, MA (US)

( * ) Notice: Subject to any disclaimer, the term of this patent is extended or adjusted under 35 U.S.C. 154(b) by 0 days.

(21) Appl. No.: 09/289,508

(22) Filed: Apr. 9, 1999

(51) Int. Cl.[7] .................................................. G08B 29/00
(52) U.S. Cl. ........................ 340/506; 340/508; 340/533; 340/825.06
(58) Field of Search .................................. 340/508, 506, 340/531, 533, 825.06

(56) References Cited

U.S. PATENT DOCUMENTS

| | | | |
|---|---|---|---|
| 4,211,920 | 7/1980 | Wakabayashi | 455/601 |
| 4,388,732 | 6/1983 | Hansel | 455/608 |
| 4,442,528 | 4/1984 | Fukuda | 375/20 |
| 4,451,916 | 5/1984 | Casper et al. | 370/16 |
| 4,524,462 | 6/1985 | Cottatelucci | 455/608 |
| 4,604,745 | 8/1986 | Takasaki et al. | 371/22 |
| 4,633,523 | 12/1986 | Witkover | 455/608 |
| 4,756,005 | 7/1988 | Shedd | 375/3.1 |
| 4,796,025 | 1/1989 | Farley et al. | 340/825.08 |
| 4,843,382 | 6/1989 | Oda et al. | 340/825.06 |
| 4,882,774 | 11/1989 | Grotzinger | 455/617 |
| 4,899,043 | 2/1990 | Mochizuki et al. | 250/227 |
| 5,212,713 | 5/1993 | Frisch | 375/3.1 |
| 5,299,201 | 3/1994 | Carusone, Jr. et al. | 371/51 |
| 5,424,708 * | 6/1995 | Ballesty et al. | 340/286.02 |
| 5,436,746 | 7/1995 | Hirst | 359/110 |
| 5,510,919 | 4/1996 | Wedding | 359/115 |
| 5,519,389 | 5/1996 | DeGunther et al. | 340/870.29 |
| 5,557,265 | 9/1996 | Moothart et al. | 340/635 |
| 5,583,892 | 12/1996 | Drakul et al. | 375/353 |
| 5,721,530 * | 2/1998 | Right et al. | 340/521 |

* cited by examiner

Primary Examiner—Daryl Pope
(74) Attorney, Agent, or Firm—Hamilton, Brook, Smith & Reynolds, P.C.

(57) ABSTRACT

A monitoring system in an alarm apparatus includes a central panel for controlling operation of the alarm apparatus, first and second terminals, the second terminal including a communication device, such as a microcontroller, to communicate with the central panel. A communication link comprising fiber-optic cables is further provided to connect the first and second terminals. The first terminal includes a signaling device to signal to the communication device when there is a break in the communication link. Responsive to the signal, the communication device signals to the central panel that there is a break in the communication link. In accordance with other aspects of the present invention, a plurality of intelligent peripherals, such as detectors and audible and visual alarms, are connected and controlled by the central panel via the fiber-optic cables. Because the system controller uses messages comprising a three-state signaling scheme and the fiber-optic cables can only support a two-state signaling scheme, the first terminal includes a converter to convert the three-state messages to two-state messages. In this manner, the peripherals connected to the central panel can be controlled over the fiber-optic cables.

34 Claims, 3 Drawing Sheets

FIBER-SYNC COMMUNICATIONS CHANNEL

BACKGROUND OF THE INVENTION

Typical building fire alarm systems include a number of fire detectors and notification appliances (e.g., audible and visual alarms) positioned throughout a building. The detectors and appliances, also referred to as peripherals, are connected to and intelligently controlled by a central panel. Signals from the detectors are monitored by the central panel which activates the notification appliances upon sensing an alarm condition.

It is desirable to have a single central panel monitor and control intelligent peripherals in more than one building due to considerations such as central panel cost. Long communication links such as fiber optics must then join remote peripherals to the main system loop.

SUMMARY OF THE INVENTION

The present invention provides a mechanism to inexpensively monitor the integrity of communication links connecting intelligent peripherals to a central panel. In particular, it may monitor the communication link between the two buildings to ensure there are no breaks or faults in the link between the buildings.

In accordance with the present invention, a monitoring system in an alarm apparatus includes a central panel for controlling operation of the alarm apparatus, first and second terminals, and a communication link interconnecting the first and second terminals. The first terminal may, for example, connect to the main loop to the panel, while the second terminal connects to remote peripherals. In a preferred embodiment of the present invention, the communication link comprises fiber-optic cables. The second terminal includes a communication device, such as a microcontroller, to communicate with the central panel. The first terminal includes a signaling device to signal to the communication device when there is a break in the communication link. Responsive to the signal, the communication device signals to the central panel that there is a break in the communication link.

A plurality of remote peripherals connected to and controlled by the central panel can include, for example, detectors to alert the central panel of an alarm condition (e.g., smoke or fire) and/or notification appliances which can include audible and/or visual alarms. The peripherals are controlled by messages received from the central panel. In a preferred embodiment of the present invention, the messages comprise a three-state signaling scheme which can include synchronization and data pulses.

The plurality of remote peripherals are connected to the second terminal. The first terminal is provided with a converter that converts the three-state signaling scheme to a two-state signaling scheme such that the communications can pass through the fiber-optic communication link. In order to distinguish the synchronization pulse from the data pulse in the converted two-state message, a frequency burst is embedded within the two-state synchronization pulse. Alternatively, the frequency burst can be embedded within the two-state data pulses.

In accordance with a further aspect of the present invention, the first terminal includes a circuit to change the frequency of the frequency burst in the event there is no communication received from the second terminal. The second terminal includes a discriminator that detects the frequency change and sends the signal to the central panel to indicate that there is a break in the communication link. In a preferred embodiment of the present invention, a frequency of 100 kilohertz in the frequency burst indicates normal operation, while a frequency of 400 kilohertz indicates a break in the communication line.

Thus, the alarm system of the present invention has the capacity to efficiently monitor the integrity of a fiber-optic communication link interconnecting a proximal location and a remote location. Furthermore, the alarm system includes the advantage of converting a three-state messaging scheme between a central panel and at least one intelligent peripheral to a two-state messaging scheme such that a fiber-optic link can be used as a communication link.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The invention disclosed herein is useful in systems such as that disclosed in U.S. Pat. No. 4,796,025 to Farley et al. (hereinafter "the '025 Farley patent"); the entire contents of said patent are incorporated herein by reference. Generally, the '025 Farley patent discloses a communication net with intelligent peripherals, i.e., peripherals which are capable of monitoring and/or controlling various devices in accordance with messages received from a central panel. The peripherals are also capable of reporting to the central panel the status of one or more devices monitored by the peripheral.

Figure 1:
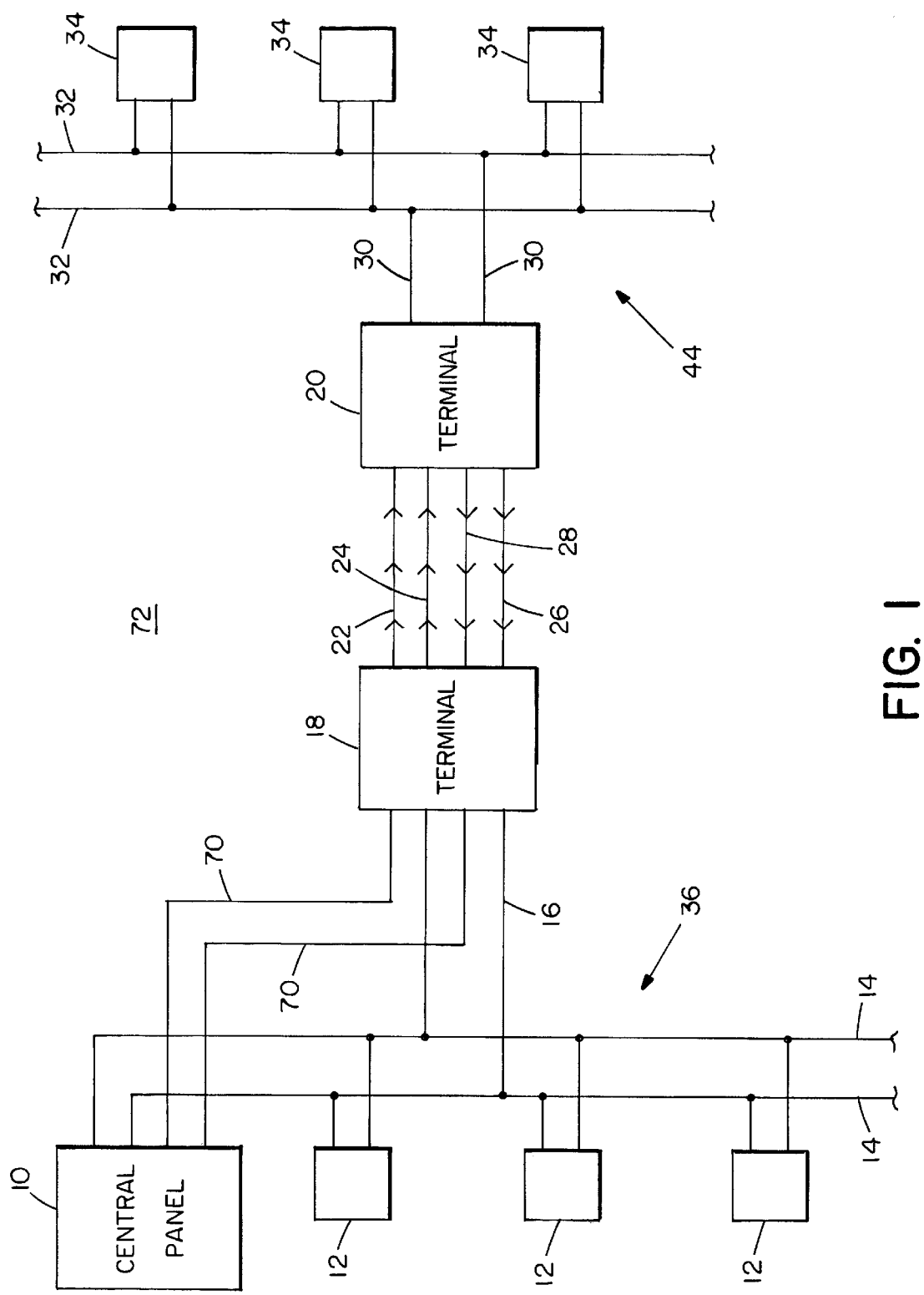
FIG. 1 is a block diagram of the alarm system in accordance with the present invention.

FIG. 1 discloses a schematic of a fire alarm system, designated generally as reference number 72. A central panel 10 is used to monitor and control one or more intelligent peripherals 12 at a proximal location via a main peripheral loop 36. The central panel 10 further monitors and controls intelligent peripherals 34 at a remote location via a remote peripheral loop 44. Remote peripherals 34 could be positioned, for example, in a building separate from central panel 10. The peripherals 12 and 34 can include a detector to detect alarm conditions (e.g., smoke or fire) and/or notification appliances comprising audible and/or visual alarms. The central panel 10 intelligently monitors and controls these peripherals via messages, for example, as taught in the '025 Farley patent.

The voltage applied to the peripherals is similar to that disclosed in commonly assigned, pending U.S. application Ser. No. 09/078,996, filed May 14, 1998, the contents of which are incorporated herein by reference. Generally, a voltage of 30 volts (DC) is applied to the peripherals in a non-alarm state (also referred to as standby mode) while a voltage of 36 volts (DC) is applied during an alarm state (referred to as the active mode).

Figure 2:
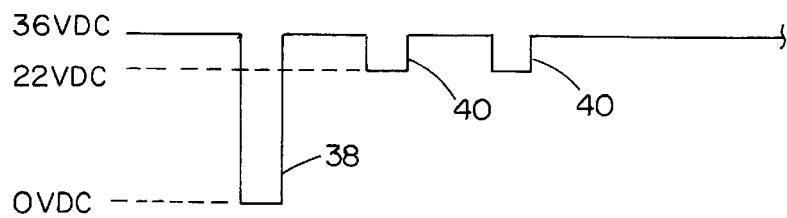
FIG. 2 illustrates an exemplary three-state message that is transmitted between the central panel and peripherals.

As shown in FIG. 2, an exemplary three-state signaling scheme is used for communications between the central panel and peripherals. A voltage of 36 volts (DC) is transmitted over a pair of communication lines, e.g., line 14 of FIG. 1, during alarm conditions. A synchronization pulse 38 is a negative going pulse between 36 volts and zero volts and is used, among other uses, to signal the beginning of a new message. Typically, the synchronization pulse 38 is followed by negative going 14 volt (DC) "logic" or data pulses 40 between approximately 36 volts and 22 volts. These pulses 40 define different codes understood by both the peripherals and central panel 10. It is understood that other voltage levels could be used in accordance with the present invention.

It is preferable to have a single central panel monitor which controls intelligent peripherals in more than one building due to considerations such as central panel cost and the desire to have a single staffed monitoring station to monitor the alarm condition in more than one building. In the preferred embodiment of the present invention, a communication link to a remote building comprises fiber-optic cables or links 22–28 interconnecting a proximal terminal 18 and a remote terminal 20, as shown in FIG. 1. Link 22 provides communication from terminal 18 to terminal 20, while link 28 provides communication from terminal 20 to terminal 18. It is preferable to have redundant links provided throughout the alarm system in the event there is a break or fault in any link(s). Accordingly, redundant link 24 provides backup communication from terminal 18 to terminal 20, while redundant link 26 provides backup communication from terminal 20 to terminal 18. Alternatively, a pair of bidirectional fiber-optic links can provide communications between terminals 18 and 20.

As seen in FIG. 1, terminal 18 is connected to the main peripheral loop 36 via communication lines 16. A pair of redundant lines 70 further connects central panel 10 to terminal 18 for purposes of fault tolerance. Terminal 20 is connected to a pair of communication lines 32 via lines 30. Remote intelligent peripherals 34 on remote peripheral loop 44 are connected to communication lines 32 and are monitored and controlled by the central panel 10. In another preferred embodiment, peripherals 34 are monitored by the central panel 10 but controlled by terminal 20.

Figure 3:
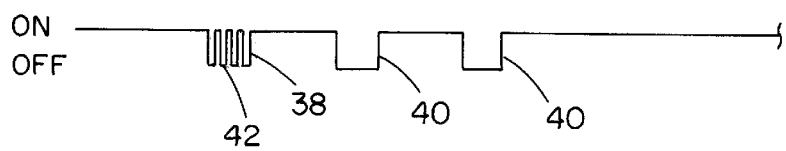
FIG. 3 illustrates a three-state message that has been converted to a two-state message including a frequency burst.

Because the peripherals 34 must communicate with the central panel 10 through the fiber-optic communication link, which can only support two-state communications, the signals must be converted from a three-state signaling scheme to a two-state signaling scheme. A communication message converted from a three-state signaling scheme is shown in FIG. 3. To distinguish the synchronization pulse 38 from the data pulses 40, a high frequency pulse burst 42 is embedded within the synchronization pulse. Alternatively, the high frequency pulse burst 42 can be embedded in data pulses 40 to distinguish the data pulses from synchronization pulse 38. In the preferred embodiment of the present invention, the high frequency burst has a frequency of 100 kilohertz under normal conditions.

Preferably, peripherals 34 have a power supply separate from peripherals 12 and terminal 20 includes a microprocessor for controlling that power supply and other features, e.g., general fault supervision, in the loop 44. In the preferred embodiment of the present invention, microprocessor 80 is an 8051 processor sold by Intel and other manufacturers. A communication device, such as a microprocessor 80, positioned at terminal 20 for purposes such as power management, is programmed to communicate a message back to the central panel 10 in the event links 22 and 24 fail to provide communication from terminal 18. However, terminal 18 does not otherwise require a microprocessor. Although simple circuitry can be included at terminal 18 to detect whether either link 26 or 28 has failed, as indicated by the lack of data received through either link, there is no microprocessor at that terminal to create the data pulses to be returned to the central panel 10. By not including a microprocessor at terminal 18, a complex circuit and the cost of the microprocessor are beneficially avoided.

In accordance with the present invention, terminal 18 includes a return link failure detector as well as a circuit to change the burst frequency 42 in the event of a failure of link 26 or 28. The microprocessor 80 at terminal 20 senses the change in the burst frequency 42 and signals to the central panel 10 a link failure. Thus, no additional communication hardware is required at terminal 18 to signal failures.

Figure 4:
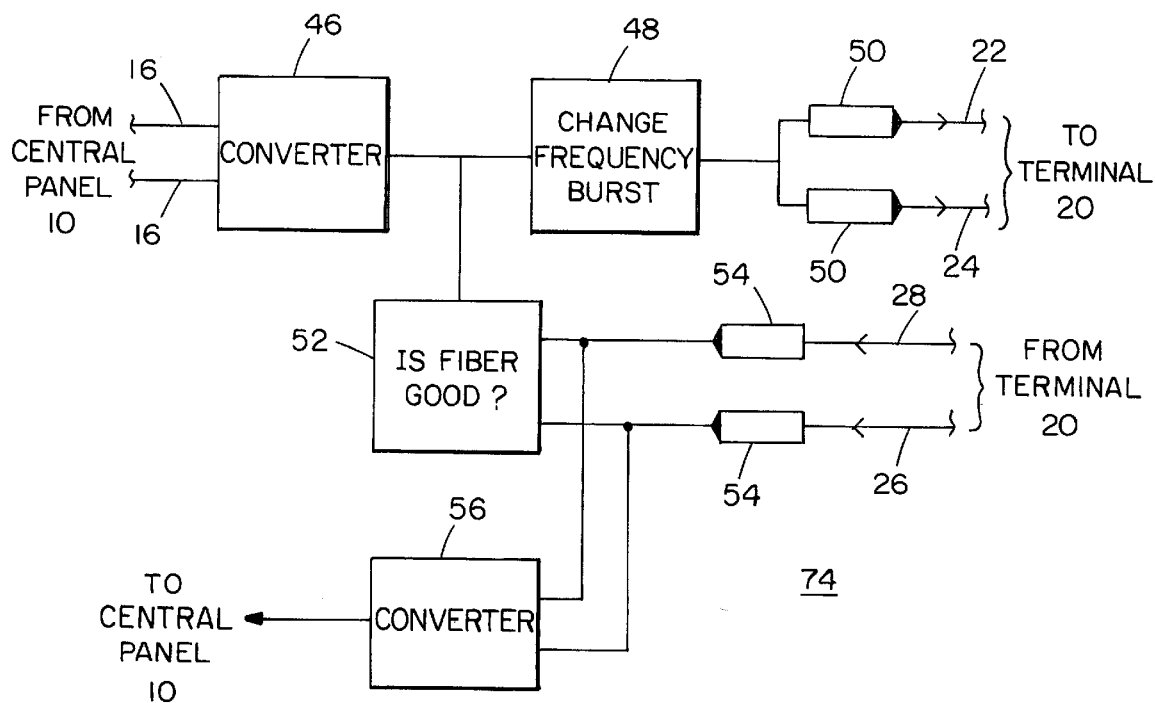
FIG. 4 is a block diagram of the circuit included within terminal 18 shown in FIG. 1.

FIG. 4 provides a block diagram of a circuit 74 positioned at terminal 18 to accomplish the foregoing. As shown, circuit 74 includes converter 46 which converts the three-state messages received from communication lines 16 to two-state logic, as described above. Circuit 74 includes fiber-optic receivers 54 for receiving messages over links 26 and 28 from terminal 20. Where link 26 or 28 fails to provide communications from terminal 20, it is detected at 52 and the frequency burst 42 is changed at 48. In the preferred embodiment of the present invention, when there is failure of either link 26 or 28, the frequency burst is changed to 400 kilohertz. It is understood that other frequencies may be used in accordance with the present invention to indicate normal and failure status. The resulting signal is forwarded by fiber-optic transmitters 50 over links 22 and 24 to terminal 20.

Figure 5:
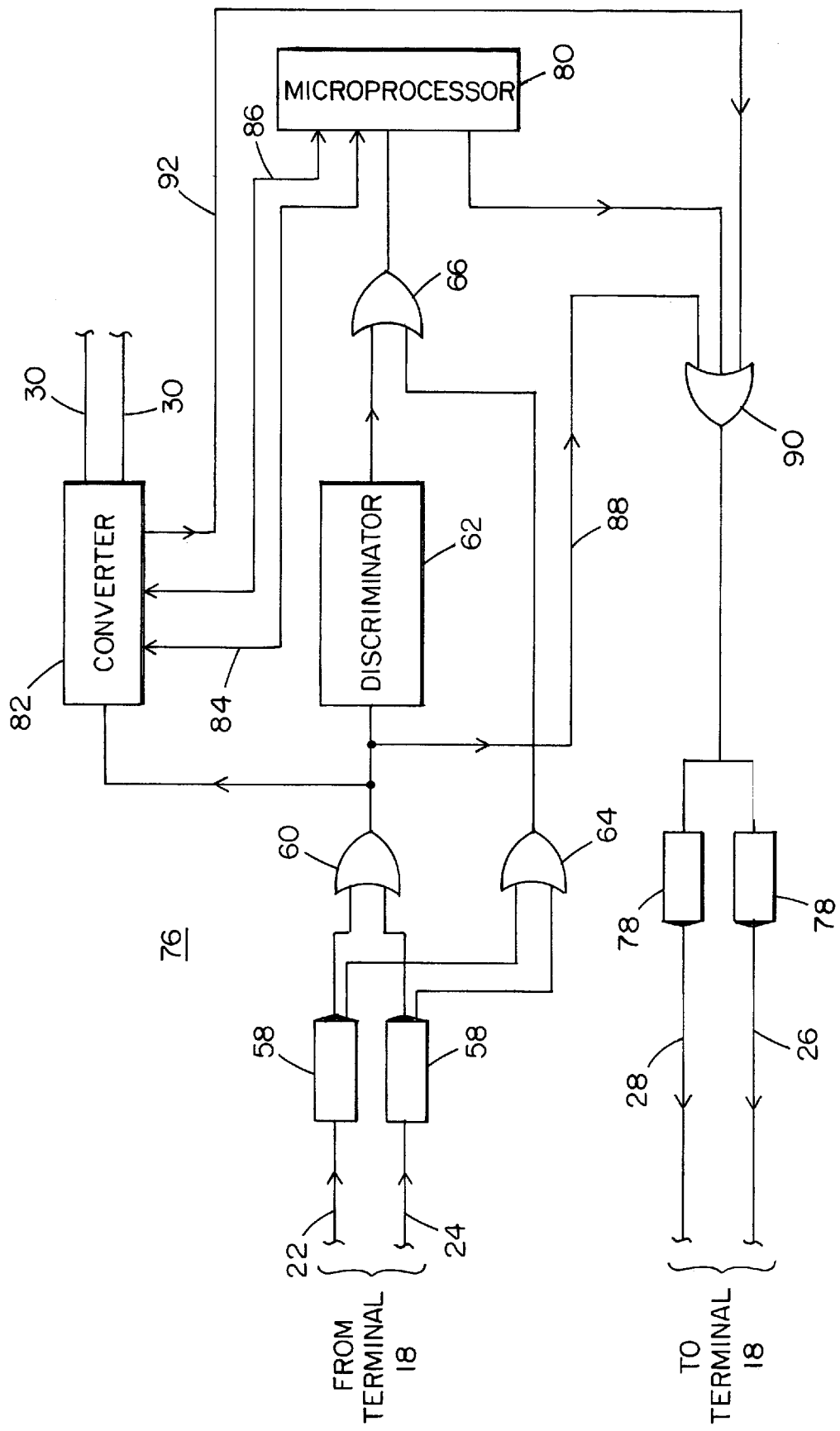
FIG. 5 is a block diagram of the circuit included within terminal 20 shown in FIG. 1.

As shown in FIG. 5, terminal 20 includes circuit 76 which includes fiber-optic receivers 58 connected to links 22 and 24 for receiving the data from terminal 18. The data is combined in an OR gate 60 to be forwarded to converter 82. Converter 82 regenerates the three-state signaling scheme (FIG. 2) from the two-state signaling scheme (FIG. 3). Converter 82 transmits the three-state signal via lines 30 to the remote intelligent peripherals 34. Converter 82 also separates the synchronization pulse 38 from data pulses 40 and sends the synchronization pulse along line 84 and data pulses along line 86 to microprocessor such that the microprocessor can provide general fault supervision of loop 44. Microprocessor 40 can also turn converter 82 on or off. When central panel 10 sends communications to peripherals 34 or microprocessor 80, data from OR gate 60 is also applied to line 88 which is forwarded through OR gate 90 to ensure communications are always provided on link 26 or 28. Converter 82 also receives communication messages from remote intelligent peripherals 34 via lines 30 and forwards the messages over line 92 to be forwarded back to central panel 10.

Data from OR gate 60 is also forwarded to discriminator 62 which determines whether the frequency burst 42 is 100 kilohertz or 400 kilohertz and forwards an appropriate signal to OR gate 66. Each of the receivers 58 also applies a signal to another OR gate 64 indicating when no data is being received from links 22 or 24. The signal received from OR gate 64, which indicates whether there is a fault in link 22 or 24, is combined in an OR gate 66 with the signal indicative of a fault in link 26 or 28. The signal from OR gate 66 is applied to microprocessor 80 which generates data to be communicated back to the central panel 10. The data from microprocessor 80 is transmitted by fiber-optic transmitters 78 through links 26 and 28 back to terminal 18. Referring back to FIG. 4, that data is converted to bi-level data by converter 56 to be forwarded to the central panel 10. More intelligence can be provided in circuits 74 and 76 to determine exactly which link contains the fault.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A monitoring system in an alarm apparatus, comprising:
    a central panel for controlling operation of the alarm apparatus;
    a first terminal and a second terminal, the second terminal including a communication device to communicate with the central panel; and
    a communication link interconnecting the first and second terminals;
    the first terminal including a signaling device to signal to the communication device when there is a break in the communication link, the communication device signaling to the central panel that there is a break in the communication link, the first terminal including a converter that converts communication messages from the central panel to be forwarded over the communication link, the communication messages comprising a three-state signaling scheme, the converter converting the three-state signaling scheme to a two-state signaling scheme.

2. The system of claim 1, wherein the communication messages comprise a synchronization pulse and a data pulse.

3. The system of claim 1, wherein the communication messages comprise a synchronization pulse and a data pulse, the converter converting the synchronization pulse to a two-state frequency burst.

4. The system of claim 3, wherein the first terminal further includes a circuit to change the frequency of the frequency burst when there is a break in the communication link.

5. The system of claim 4, wherein the second terminal includes a discriminator that detects the change in the frequency burst.

6. The system of claim 4, wherein the normal frequency burst is 100 kilohertz and the frequency, when there is a break in the communication link, is 400 kilohertz.

7. The system of claim 1, wherein the communication link comprises a fiber-optic link.

8. The system of claim 1, wherein the communication link comprises a first fiber-optic link that carries communications from the first terminal to the second terminal and a second fiber-optic link that carries communications from the second terminal to the first terminal.

9. The system of claim 8, wherein the communication link further comprises a third fiber-optic link that provides redundant communication from the first terminal to the second terminal and a fourth fiber-optic link that provides redundant communication from the second terminal to the first terminal.

10. The system of claim 9, wherein the signaling device signals to the communication device when there is a break in the second or fourth fiber-optic link.

11. The system of claim 9, wherein the communication device signals to central panel when there is a break in the first or third fiber-optic link.

12. The system of claim 1, wherein the communication device includes a microprocessor.

13. The system of claim 1, further comprising at least one peripheral connected to the second terminal which communicates with the central panel.

14. The system of claim 13, wherein the peripheral comprises a detector.

15. The system of claim 13, wherein the peripheral comprises a notification appliance including an audible alarm.

16. The system of claim 13, wherein the peripheral comprises a notification appliance including a visual alarm.

17. The system of claim 1, further comprising at least one peripheral connected to the central panel.

18. A method of monitoring an alarm apparatus, comprising:
    controlling the operation of the alarm apparatus with a central panel;
    providing a first terminal and a second terminal, the second terminal including a communication device to communicate with the central panel;
    interconnecting the first and second terminals with a communication link;
    providing the first terminal with a signaling device to signal to the communication device when there is a break in the communication link;
    converting three-state communication messages received at the first terminal to be forwarded over the communication link as two-state communication messages; and
    signaling to the central panel that there is a break in the communication link.

19. The method of claim 18, further comprising the step of embedding a frequency burst into the two-state message representing a synchronization pulse.

20. The method of claim 19, further comprising the step of changing the frequency of the frequency burst when there is a break in the communication link.

21. The method of claim 20, further comprising the step of detecting the change in the frequency burst at the second terminal and signaling to the central panel that there is a break in the communication link.

22. The method of claim 19, wherein the communication link comprises a first fiber-optic link that carries communications from the first terminal to the second terminal and a second fiber-optic link that carries communications from the second terminal to the first terminal, further comprising the step of providing a first redundant fiber-optic communication link from the first terminal to the second terminal and a second redundant fiber-optic link from the second terminal to the first terminal.

23. The method of claim 22, further comprising the step of signaling to the central panel when there is a break in the second fiber-optic link or the second redundant fiber-optic link.

24. The method of claim 22, further comprising the step of signaling to the central panel, with the communication device, when there is a break in the first fiber-optic link on the first redundant fiber-optic link.

25. The method of claim 18, further comprising the step of connecting at least one intelligent peripheral to the second terminal, the peripheral to be controlled by messages received from the central panel.

26. A fire alarm communication system, comprising:

a central panel;

plurality of proximal peripherals and a plurality of remote peripherals connected and controlled by the central panel;

a first terminal connected between the central panel and the remote peripherals that converts three-state communication messages received from the central panel to two-state communication messages;

a second terminal connected between the first terminal and the remote peripherals, the second terminal including a communication device for communicating with the central panel;

a communication link interconnecting the first and second terminals; and a signaling device in the first terminal that signals to the second terminal when there is a break in the communication link, the second terminal communicating to the central panel that there is a break in the communication link.

27. The system of claim 26, wherein the converted two-state messages include a high frequency burst representing a synchronization pulse.

28. The system of claim 27, wherein the frequency of the frequency burst is changed by the first terminal when there is a break in the communication link.

29. The system of claim 28, wherein the second terminal, responsive to the change in the frequency burst, signals to the central panel that there is a break in the communication link.

30. The system of claim 26, wherein the communication link comprises a first fiber-optic link that carries communications from the first terminal to the second terminal and a second fiber-optic link that carries communications from the second terminal to the first terminal.

31. The system of claim 30, wherein the communication link further comprises a third fiber-optic link that provides redundant communication from the first terminal to the second terminal and a fourth fiber-optic link that provides redundant communication from the second terminal to the first terminal.

32. The system of claim 31, wherein the signaling device signals to the second terminal when there is a break in the second fiber-optic link or the fourth redundant fiber-optic link.

33. The system of claim 26, wherein the communication device includes a microprocessor.

34. The system of claim 26, wherein the proximal and remote peripherals comprise detectors, and audible and visual alarms.

* * * * *

UNITED STATES PATENT AND TRADEMARK OFFICE
CERTIFICATE OF CORRECTION

PATENT NO. : 6,265,971 B1
DATED : July 24, 2001
INVENTOR(S) : Paul H. Maier, Jr., Anthony J. Capowski, and Timothy E. Dorr It is certified that error appears in the above-identified patent and that said Letters Patent is hereby corrected as shown below:

<u>Column 6,</u>
Line 47, delete "claim 19" and insert -- claim 18 --.

Signed and Sealed this

Twenty-ninth Day of January, 2002

Attest:

JAMES E. ROGAN
*Attesting Officer*  *Director of the United States Patent and Trademark Office*